March 28, 1961 R. D. GOODENOUGH 2,977,185
PROCESS FOR THE RECOVERY AND SEPARATION OF LITHIUM
AND ALUMINUM FROM LITHIUM ALUMINATE COMPLEX
Filed Jan. 29, 1957
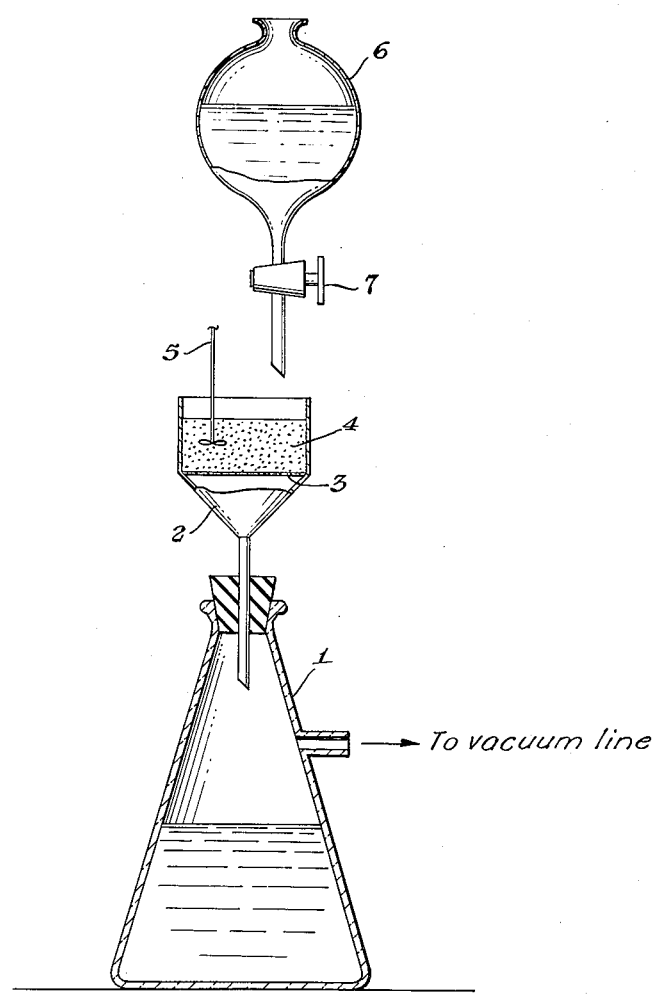
INVENTOR.
Robert D. Goodenough
BY
Griswold & Burdick
ATTORNEYS

United States Patent Office 2,977,185
Patented Mar. 28, 1961

2,977,185

PROCESS FOR THE RECOVERY AND SEPARATION OF LITHIUM AND ALUMINUM FROM LITHIUM ALUMINATE COMPLEX

Robert D. Goodenough, Midland, Mich., assignor to The Dow Chemical Company, Midland, Mich., a corporation of Delaware Filed Jan. 29, 1957, Ser. No. 636,955

9 Claims. (Cl. 23—25)

This invention relates to a process for the recovery of lithium and aluminum from a lithium aluminate complex, and more particularly, to a process for dissociating the lithium aluminate complex and separating the lithium and aluminum by contacting the complex with an ion exchange resin.

The production of lithium has been mainly limited to recovery of the metal from natural mineral deposits, such as spodumene, lepidolite, amblygonite, and others which require extensive processing. In a co-pending application, Serial Number 636,953, filed January 29, 1957, in the name of the same inventor as the instant application, there is described a process whereby lithium may be recovered from lithium-containing solutions, which heretofore have never been used as sources for lithium. In that disclosed process the lithium is recovered from these brines by the precipitation of the lithium as a lithium aluminate complex. An economical method for the recovery of lithium from this complex is desirable so that lithium bearing brines may be utilized as sources of lithium to meet the demand for the metal and its compounds. The prior art for recovery of lithium from lithium aluminate complex involves dissolving the complex in an acid, titrating the resulting solution with a basic compound to precipitate the aluminum from the solution as aluminum hydroxide, and then recovering the lithium from the remaining solution. This prior art process requires the use of acid and alkali and is expensive.

It is, therefore, a principal object of this invention to provide an economical method for the recovery and the separation of lithium and aluminum from a lithium aluminate complex. A further object is to provide a process for the recovery of lithium from the complex. Other objects and advantages of this invention will become apparent from the following detailed description thereof when read in conjunction with the attached drawing which illustrates a semicontinuous laboratory process for the recovery of lithium and aluminum from the complex.

The above and additional objects may be accomplished by the present invention, which comprises intermixing, in the presence of water, the lithium aluminate complex with an ion exchange resin to dissociate the complex. Upon dissociation of the complex in the presence of an ion exchange resin, the lithium and aluminum are converted to forms which enable them to be readily separated.

The term "lithium aluminate complex," as used herein, means the hydrated lithium aluminate composition which precipitates upon intermixing a lithium chloride or lithium nitrate solution with a soluble aluminum salt under neutral or slightly alkaline conditions at a temperature in the range of 20° to 100° C. The actual composition of this precipitate is not known, but it contains lithium and aluminum in an atomic ratio of 1Li:2-3.5Al. X-ray diffraction analysis of the complex shows an unreported crystal structure and a slight excess of aluminum hydroxide in the bayerite form. These complexes may be obtained from relatively pure solutions of lithium and aluminum salts and also may be obtained from solutions which contain a high concentration of water-soluble salts other than lithium or aluminum by the method described in the above cited patent application.

It has been discovered that when the lithium aluminate complex is contacted with an anion exchange resin in the hydroxyl form, it will dissociate and the lithium and the aluminum will be converted to lithium hydroxide and aluminum hydroxide. Furthermore, it has been discovered that an especially high degree of separation may be obtained between the lithium hydroxide and the aluminum hydroxide by removing the lithium hydroxide from the mixture as soon as it is formed. In the process, the lithium aluminate complex is dissociated to lithium hydroxide and aluminum hydroxide and the separation between the lithium and the aluminum is effected by taking advantage of the different degree of solubility in water of the respective hydroxides. The lithium hydroxide being quite soluble is dissolved in water and withdrawn from the mixture, while the aluminum hydroxide being substantially insoluble will remain suspended with the resin and is later recovered. If the solution and precipitate are not separated promptly, lithium hydroxide will react with the aluminum hydroxide to form $LiAlO_2$, thus reducing the degree of separation. The $LiAlO_2$ is partially soluble and some of the salt will pass through the resin bed with the lithium hydroxide. When the lithium aluminate complex is contacted with the resin for around 15 minutes and the lithium hydroxide and the aluminum hydroxide formed are intermixed for this length of time, the lithium hydroxide effluent will contain around 11 percent of the aluminum, as $LiAlO_2$. By extending the contact time to about 1 hour, the $LiAlO_2$ content increases to approximately 20 percent of the total aluminum.

To minimize the reaction of the lithium hydroxide with the aluminum hydroxide, a batch process with a very short contact time may be used. It is, however, preferred to use a semi-continuous process wherein an aqueous slurry of the complex is continuously charged into a bed containing a given amount of resin and the lithium hydroxide formed is continuously withdrawn from the bed as a water solution. The attached drawing illustrates such a semi-continuous laboratory process, wherein are assembled a vacuum flask 1, a Buchner funnel 2, in which the ion exchange resin 4, has been placed on top of filter pad 3, and a separatory funnel 6. In the operation of the apparatus, sufficient amount of water is added to the ion exchange resin 4 to obtain a fluid mixture which can be agitated by stirrer 5. A slurry of lithium aluminate complex is placed in separatory funnel 6 from which the rate of flow of the slurry to the Buchner funnel may be controlled by use of petcock 7. The rate of flow of the slurry into the ion exchange bed is set at a desired rate and the vacuum on the flask 1 is adjusted so that the rate of lithium hydroxide being withdrawn from the bed is equal to the rate that the slurry is being added to the resin. Upon the dissociation of the complex, the lithium hydroxide formed dissolves in the water which is introduced with the slurry and is continuously removed from the mixture. The aluminum hydroxide formed will remain suspended in the bed.

In contacting the complex with the resin, it is preferred to maintain a certain amount of water in the mixture so that a fluid bed may be maintained which can be agitated to obtain a good contact between the resin and the complex. When the lithium hydroxide solution is withdrawn at the same rate that the slurry is added, the bed at all times will contain a certain amount of lithium hydroxide solution. Thus, while the reaction between lithium hydroxide and aluminum hydroxide is not entirely eliminated by continuously withdrawing lithium hydroxide, the amount of lithium hydroxide contacting the aluminum hydroxide is maintained at a minimum so that the average contact time of the lithium hydroxide with aluminum hydroxide is relatively short.

To aid in minimizing the reaction between the lithium hydroxide and the aluminum hydroxide, it is desirable to have a high rate of conversion of the complex to the hydroxides. Thus, a high rate of flow may be maintained through the resin bed to reduce the average time the lithium hydroxide solution remains in the bed. Ion exchange resins have a fixed capacity for the exchange of ions and their activity depends upon the degree with which this capacity has been utilized. With freshly reactivated resin, the lithium aluminate complex can be converted to lithium hydroxide and aluminum hydroxide at a rapid rate, but as the ion exchange resin capacity is utilized, the conversion rate will decrease. To realize a fairly rapid average conversion rate, an excess of resin is generally used. The total amount of slurry that is passed into contact with a given amount of the ion exchange resin is such that only from 60 to 80 percent, preferably around 75 percent of the total ion exchange capacity of the resin is utilized.

It is apparent that it is not necessary to add a slurry of the lithium aluminate complex to the resin, but that the complex may be added to the resin in a dry state and sufficient water simultaneously or subsequently added to the mixture. The amount of water used, whether with the slurry or added separately, is not critical, but will determine the concentration of the lithium hydroxide solution obtained as product and also the concentration of the small amount of lithium hydroxide solution which is in the bed during the contacting operation. When a small amount of water is used with respect to the complex, the more concentrated solution of lithium hydroxide obtained as the product causes a higher percentage of the aluminum hydroxide in the bed to react with the lithium hydroxide. By using an agueous slurry which contains from 2 to 6 weight percent of the complex, generally less than 5 percent of the aluminum is converted to the partially soluble salt. With a slurry of the above concentration, the slurry is generally added to the resin at a rate in the range of 0.1 to 0.3 ml. of slurry per minute per cubic centimeter of resin. At these rates, the addition of the complex in most cases is approximately equal to the average rate at which the complex is converted to the hydroxides. With slurries containing less than 2 weight percent of the complex, less of the aluminum hydroxide will react with the lithium hydroxide and higher feed rates of slurry may be used. With slurries containing greater than 6 weight percent of the complex, the contrary would be true.

The aluminum hydroxide which remains suspended in the resin bed may be recovered by known mechanical means, such as vigorous back washing and screening. Also, it may be recovered by converting the aluminum hydroxide to a soluble alkali metal aluminate during the regeneration of the resin and eluting it from the bed. Reactivation of the bed with a strong alkali metal hydroxide, such as sodium hydroxide and potassium hydroxide, will form the soluble alkali metal aluminate. Since it is not necessary to recover all of the aluminum hydroxide from a large bed by mechanical means, it is preferred to recover part of the aluminum hydroxide by back washing and the remainder during regeneration.

The aluminum hydroxide recovered by back washing may then be combined with the effluent obtained during regeneration to react with the excess alkali metal hydroxide present in the effluent and be used for the precipitation of the lithium aluminate complex from fresh lithium solutions.

While either the strongly basic or slightly basic anion exchange resins in the hydroxyl form may be used, the strongly basic quaternary ammonium type resins, such as described in United States Letters Patents Numbers 2,591,573, 2,614,099, and 2,597,440, are preferred. With these strongly basic quaternary ammonium type resins, substantially complete dissociation of the complex with recovery of up to 99 percent of the lithium as lithium hydroxide may be obtained. Illustrative examples of other than the preferred anion exchange resins are those described in United States Letters Patents Numbers 2,341,907, 2,546,938, and 2,591,574.

Although the discussion above has been limited to the use of anion exchange resins, cation exchange resins may also be employed to effect the dissociation and separation of the lithium and aluminum. Upon the dissociation of the complex in the presence of the cation exchange resin, the lithium is bound by the resin and the aluminum is converted to aluminum hydroxide. Either the salt form or hydrogen form of the resin may be used.

The anion exchange resin is generally superior to the cation exchange resins. With the anion exchange resins, substantially complete dissociation and separation of the lithium and aluminum may be effected with a relatively small amount of resin and in a short time. This degree of recovery of the lithium and aluminum from the complex is more difficult to obtain with the cation exchange resins.

Since the precipitation of the lithium aluminate complex is generally made from solutions containing a high concentration of impurities, such as for example, sodium chloride and calcium chloride, the complex contains a relatively large amount of the impurities due to occlusion. Thus, the effectiveness of the cation exchange resin may be partially decreased due to the presence of these impurities in the complex.

With the cation exchange resins in the salt form, for example in the sodium form, the impurities, such as sodium chloride, decrease the rate of reaction and effectiveness of the resin, since the sodium chloride will tend to maintain the resin in the sodium form. Thus, in order to obtain a high degree of dissociation of the complex and separation of the lithium, a relatively large amount of resin for a given amount of complex slurry is used, or the complex slurry is repeatedly contacted with fresh resin as in a countercurrent continuous process.

When the hydrogen form of the cation exchange resin is used, the capacity of the resin available for lithium is decreased and also the anions of the impurities combine with the hydrogen ions to form hydrogen chloride. This hydrogen chloride reacts with the aluminum hydroxide to form aluminum chloride which results in the aluminum being bound by the resin and thus displacing a portion of the lithium from the resin. The displaced lithium is converted to lithium chloride and must then be recovered from the liquid portion of the slurry. To minimize the displacement of the lithium by the aluminum on the cation exchange resin, the procedures used for contacting the complex with the resin are similar to those used with anion exchange resins. However, different rates and contact times are employed. In a batch process, a contact time in the range of 5 to 30 minutes is generally used.

The lithium bound by the resin is recovered by eluting the resin with a base, acid, or a salt, after the aluminum hydroxide suspended in the resin bed is removed by vigorous back washing, screening or other mechanical means. If it is desirable to recover the lithium as lithium hydroxide, caustic may be used. However, if it is desirable to recover the lithium as a soluble salt, dilute acids, such as hydrochloric acid, hydrobromic acid, hydriodic acid, nitric acid, acetic acid, etc. or a sodium or potassium salt of these acids may be used.

Illustrative examples of the cation exchange resins which may be used are the strongly acidic sulfonic type resins, such as described in United States Letters Patents Numbers 2,597,438, 2,500,149, and 2,366,007 and other type of resins such as described by United States Letters Patent Number 2,471,818. The strongly acidic sulfonic type resins are preferred.

The temperatures and pressures under which the lithium aluminate complex is contacted with either the anion exchange resins or cation exchange resins are governed by the stability of the resins. Temperatures from 5° to 95° C. may be used, but generally a temperature close to room temperature, in the range of 20 to 30° C., is employed. Normally, pressures close to atmospheric pressure are used with a sufficient differential pressure to regulate the flow of the effluent from the bed.

The following examples further illustrate the invention, but are not to be construed as limiting the invention thereto.

Example I

The laboratory apparatus as shown in the attached drawing was used. One hundred milliliters of a quaternary ammonium type anion exchange resin in the hydroxyl form, such as disclosed in United States Patent Number 2,591,573, and similar to the product sold by The Dow Chemical Company under the trademark of "Dowex-1" was placed in the Buchner funnel and the resin bed was slurried with sufficient water to give it mobility while being stirred. A quantity of lithium aluminate complex containing lithium equivalent to 152 mg. of lithium chloride and 277.5 mg. of aluminum was slurried with water to give 100 ml. of mixture at room temperature and placed in the separatory funnel as shown in the drawing. The lithium aluminate complex flow into the Buchner funnel and the flow of the effluent from the resin bed were adjusted to a rate of 10 ml. per minute. The resin bed was stirred continuously. After the passage of the complex into the resin bed, the bed was washed with 350 ml. of water. Analysis of the total effluent for lithium and aluminum indicated that it contained 150 ml. of lithium as lithium chloride and 12.7 mg. of aluminum. This represented a 98.7 percent recovery of the lithium and a conversion of less than 4.6 percent of the aluminum to the partially soluble $LiAlO_2$.

The lithium-free resin was transferred from the funnel to a beaker where it was slurried with 220 ml. of water, filtered through a 60-mesh, United States Sieve Series, conical screen, and washed with 250 ml. of water. The filtrate was analyzed for aluminum and found to contain 206.5 mg. of aluminum. This represented over 75 percent recovery of the aluminum as aluminum hydroxide. It is anticipated that this yield could be considerably increased by decreasing the mechanical losses.

Example II

A series of runs was made where a quantity of lithium aluminate complex containing lithium equivalent to 73.8 mg. of lithium chloride was slurried with 50 ml. of water and added to 10 ml. of a strongly acidic sulfonic type cation exchange resin, such as described in United States Letters Patent Number 2,366,007 and similar to the product sold by The Dow Chemical Company under the trademark of "Dowex-50." The resin was in the sodium salt form.

In these runs the slurry was agitated with the ion exchange resin for different lengths of time after which the resin was separated from the resulting aluminum hydroxide by screening and eluted with 3 N hydrochloric acid. Lithium in the acid effluent from the resin was determined by flame spectrophotometry and the amount of the lithium bound by the resin was determined. The results obtained are shown in the table below.

| Length of Time Slurry Contacted with Resin, Hours | Percent of Lithium in Complex Bound by Resin |
|---|---|
| 0.5 | 18.7 |
| 1.5 | 20.3 |
| 5.0 | 26.3 |

A series of runs similar to above were made except that the acid or hydrogen form of the resin was used. The results obtained are given in table below.

| Length of Time Slurry Contacted with Resin, Minutes | Percent of Lithium in Complex Bound by Resin |
|---|---|
| 1 | 15.4 |
| 5 | 21.6 |
| 30 | 19.5 |
| 90 | 15.4 |

From the above results, it can be seen that when the contact time was increased, the amount of lithium bound by the resin decreased appreciably. This effect, no doubt, is due to the displacement of the lithium on the resin by aluminum.

It will be apparent from the detailed description and examples that the use of an ion exchange resin to obtain the dissociation of the lithium aluminate complex and separation of lithium and aluminum is a convenient and economical method for recovery of the lithium and aluminum from the complex. Acids or alkalis do not have to be used and thus tedious titrations do not have to be carried out. By using an ion exchange resin, the dissociation of the complex and a good separation of the lithium and aluminum is obtained in one step. With the preferred anion exchange resins, up to 99 percent of the lithium in the complex may be recovered with relatively small amount of resin and in a short contact time.

What is claimed is:

1. A process for the recovery of lithium and aluminum values from a solid lithium aluminate complex, which comprises intermixing, in the presence of water, the solid lithium aluminate complex with a solid ion exchange resin selected from the group consisting of anion exchange resins in the hydroxyl form and cation exchange resin in salt and hydrogen form thereby dissociating the lithium aluminate complex to lithium values and aluminum hydroxide, and separating the lithium values from the aluminum hydroxide.

2. A process for the recovery of lithium and aluminum from a solid lithium aluminate complex, which comprises intermixing, in the presence of water, the solid lithium aluminate complex with a solid anion exchange resin in the hydroxyl form thereby to convert the complex to lithium hydroxide and aluminum hydroxide and separating the lithium hydroxide from aluminum hydroxide.

3. A process for the recovery and separation of lithium and aluminum from a solid lithium aluminate complex, which comprises intermixing, in the presence of water, the solid lithium aluminate complex with a solid strongly basic quaternary ammonium type anion exchange resin in the hydroxyl form and recovering the lithium as a lithium hydroxide solution and the aluminum as an aluminum hydroxide precipitate.

4. A process for the recovery and the separation of lithium and aluminum from a solid lithium aluminate complex, which comprises continuously charging a given volume of an aqueous slurry of the lithium aluminate complex into an agitated bed of a solid strongly basic quaternary ammonium type anion exchange resin in the hydroxyl form until 60 to 80 percent of the total ion exchange resin in the bed is utilized to convert the complex to lithium hydroxide and aluminum hydroxide, continuously withdrawing the lithium hydroxide as a solution from the resin bed, and separating the aluminum hydroxide from the resin bed.

5. A process for the recovery and the separation of lithium and aluminum from a solid lithium aluminate complex, which comprises continuously charging an aqueous slurry of the lithium aluminate complex into an agitated bed of a solid strongly basic quaternary ammonium type anion exchange resin in the hydroxyl form until 60 to 80 percent of the total ion exchange capacity of the anion exchange resin in the bed is utilized to convert the complex to lithium hydroxide and aluminum hydroxide, continuously withdrawing the lithium hydroxide as a solution from the resin bed, and subsequently contacting the resin with a hydroxide selected from the group consisting of sodium hydroxide and potassium hydroxide to reactivate the bed and to convert the aluminum hydroxide in the bed to a soluble alkali metal aluminate, and recovering the soluble alkali metal aluminate.

6. A process for the recovery of lithium from a solid lithium aluminate complex as a lithium hydroxide solution which comprises intermixing the lithium aluminate complex with a solid strongly basic quaternary ammonium type anion exchange resin in the hydroxyl form in the presence of water, and removing the lithium hydroxide solution formed from the mixture.

7. A process for the recovery of lithium from a solid lithium aluminate complex as lithium hydroxide, which comprises continuously charging an aqueous slurry of the lithium aluminate complex into an agitated bed of a solid strongly basic quaternary ammonium type anion exchange resin in the hydroxyl form until 60 to 80 percent of the total ion exchange capacity of the anion exchange resin in the bed is utilized to convert the complex to lithium hydroxide and aluminum hydroxide, and continuously removing the lithium hydroxide as a solution from the resin bed.

8. A process for the recovery of lithium from a solid lithium aluminate complex as lithium hydroxide, which comprises continuously charging an aqueous slurry of the lithium aluminate complex containing from 2 to 6 weight percent of the complex into an agitated bed of a solid strongly basic quaternary ammonium type anion exchange resin in the hydroxyl form at a rate in the range of 0.1 to 0.3 ml. of slurry per minute per cubic centimeter of resin until 75 percent of the total ion exchange capacity of the anion exchange resin in the bed is utilized to convert the complex to lithium hydroxide and aluminum hydroxide, and continuously removing the lithium hydroxide as a solution from the resin bed.

9. A process for the recovery of lithium and aluminum from a solid lithium aluminate complex, which comprises intermixing, in the presence of water, the solid lithium aluminate complex with a solid cation exchange resin thereby to dissociate the complex, to bind the lithium to the resin, and to convert the aluminum to aluminum hydroxide, separating the aluminum hydroxide from the contacted resin, and recovering the lithium from the contacted resin.

References Cited in the file of this patent

UNITED STATES PATENTS

| | | |
|---|---|---|
| 1,924,503 | Lambert | Aug. 29, 1933 |
| 1,943,786 | Cowles | Jan. 16, 1934 |
| 2,606,098 | Bauman | Aug. 5, 1952 |

FOREIGN PATENTS

| | | |
|---|---|---|
| 633,008 | Great Britain | Dec. 5, 1949 |

OTHER REFERENCES

Wheaton et al.: "Industrial and Engineering Chemistry," vol. 43, No. 5, pages 1088–1093, May 1951.

Mellor: "Comprehensive Treatise on Inorganic and Theoretical Chemistry," Longmans, Green and Co., N.Y., vol. V, 1924, pages 278, 286, 287.

Horan et al.: "J. Am. Chem. Soc.," vol. 57, pages 2434–2436 (1935).

Nachod et al.: "Ion Exchange Technology," Academic Press Inc., N.Y., 1956, page 294.

Kunin: "Industrial and Engineering Chemistry," vol. 42, No. 1, pages 65 to 70, January 1950.